July 26, 1960
H. F. WAHL
2,946,619
DOUBLE SOCKET AND SLING STRUCTURE
Filed Sept. 20, 1955
2 Sheets-Sheet 1
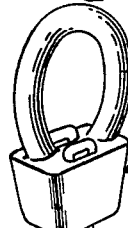
Fig.1
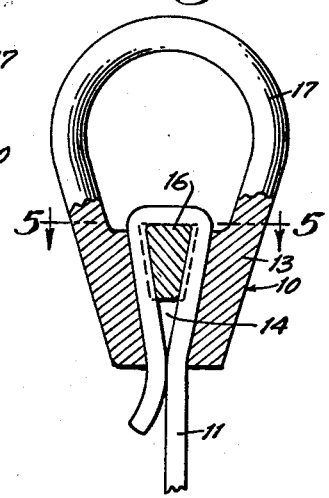
Fig.3
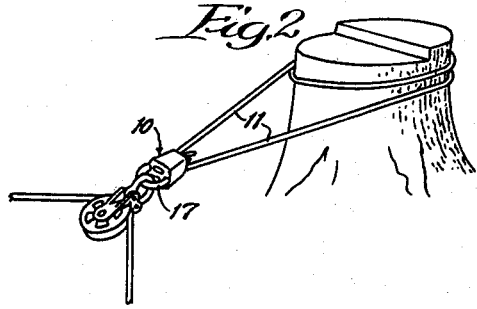
Fig.2
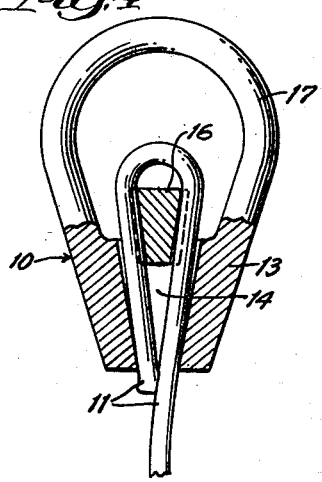
Fig.4
Fig.5
Fig.6
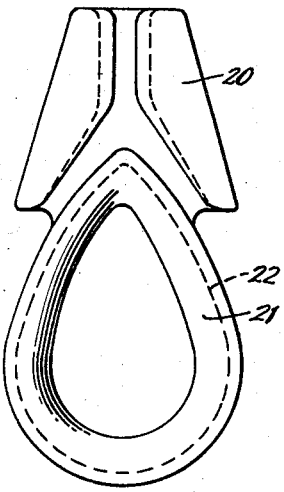
Fig.7
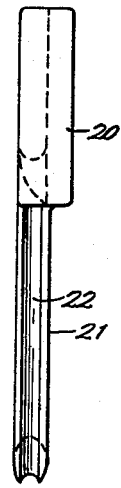
Fig.8
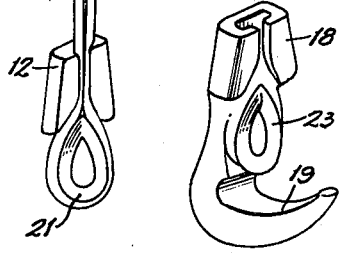
Fig.9
INVENTOR:
Harold F. Wahl,
BY
Dawson, Tilton & Graham
ATTORNEYS.

July 26, 1960 H. F. WAHL 2,946,619
DOUBLE SOCKET AND SLING STRUCTURE
Filed Sept. 20, 1955 2 Sheets-Sheet 2
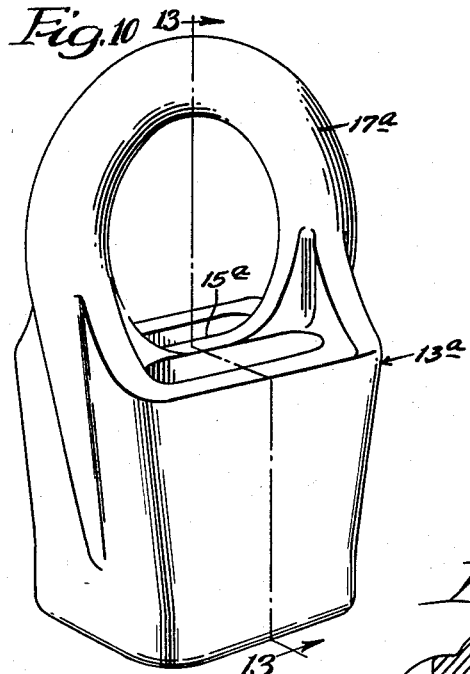
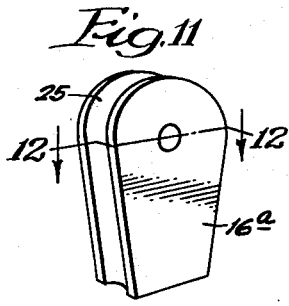
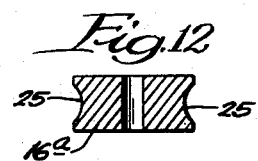
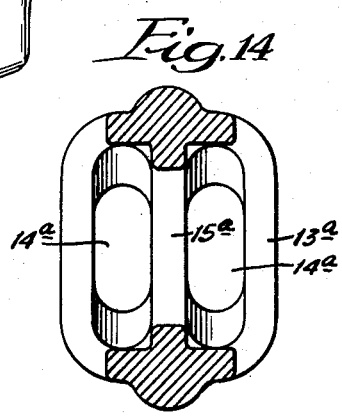
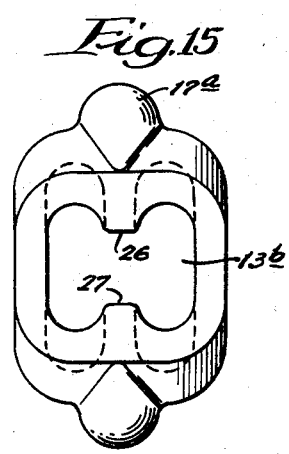
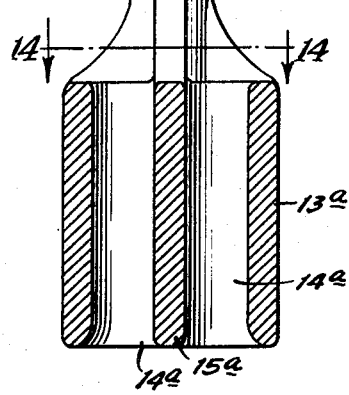
INVENTOR:
Harold F. Wahl,
BY
Dawson, Tilton & Graham,
ATTORNEYS.

2,946,619

DOUBLE SOCKET AND SLING STRUCTURE

Harold F. Wahl, Portland, Oreg., assignor to Electric Steel Foundry Company, Portland, Oreg., a corporation of Oregon Filed Sept. 20, 1955, Ser. No. 535,413

2 Claims. (Cl. 294—74)

This invention relates to a double socket and sling structure. The invention is particularly useful in connection with a double socket wedge block device equipped with a single eye and with sling elements combined therewith.

An object of the invention is to provide a double line sling structure in which the ends of a cable may be readily anchored within a double socket block while providing an eye for use with pulleys, lead blocks, etc. Another object is to provide a double wedge type socket equipped with an eye and strap means therewith for providing a haul-back tail or means for readily anchoring a single eye block for use in various obvious rigging arrangements. A still further object is to provide a sling structure and block means whereby an eye-equipped block member may be provided with double wedges for anchoring the ends of a cable from the block for various anchoring or supporting purposes, while at the same time firmly holding within the block the two ends of the cable to produce an effective balance therebetween with respect to an integral single eye carried by the block. A still further object is to provide, in combination with an eye-equipped block and socket means for confining cable ends therein, quick-change fittings, equalizer eyes, etc., which may be employed with the loop formed by the cable, the ends of which are locked within said block. Yet another object is to provide in an eye-equipped block means for confining wedge plates therein in spaced relation, the wedge plates having grooves therein for receiving partial portions of cables, etc. Other specific objects and advantages will appear as the specification proceeds.

The invention is shown, in illustrative embodiments, by the accompanying drawings, in which—

Figure 1 is a perspective view of sling-supporting means embodying my invention; Fig. 2, a perspective view showing sling means for supporting an eye-equipped block so as to provide a support for a pulley, etc.; Fig. 3, an enlarged and part sectional view in elevation of the double socket block shown in Fig. 1; Fig. 4, a view similar to Fig. 3, but showing a cable end in raised position and partly detached from the block; Fig. 5, a transverse sectional view, the section being taken as indicated at line 5—5 of Fig. 3; Fig. 6, a bottom plan view of the double socket block, the cable being removed; Fig. 7, a perspective view of the equalizer eye structure shown in Fig. 1; Fig. 8, a side view in elevation of the structure shown in Fig. 7; Fig. 9, a perspective view of a quick-change fitting providing a hook with which the end of the cable may be employed; Fig. 10, a perspective view of a modified form of socket structure; Fig. 11, a perspective view of a wedge block; Fig. 12, a sectional view of the wedge plate, section being taken as indicated at line 12—12 of Fig. 11; Fig. 13, a sectional view, the section being taken as indicated at line 13—13 of Fig. 10; Fig. 14, a transverse sectional view, the section being taken as indicated at line 14—14 of Fig. 13; and Fig. 15, a bottom plan view of a modified form of socket.

In the illustration given in Figs. 1–9, 10 designates a double socket block to which is secured the ends of a cable 11, the lower portion of the cable being received within an equalizer eye 12.

The double socket block, as shown best in Figs. 3 to 6, inclusive, comprises a lower solid block portion 13 having therein wedge-shaped openings or pockets 14 which extend all the way through the block 13. The two sockets 14 are spaced apart by a central web portion 15. Through each of the wedge-shaped pockets 14 is extended the end of the cable 11, and the looped upper portion of the cable is extended about a triangular wedge plate 16. The wedge plates are placed in position, as illustrated in Fig. 4, and after the cable 11 is then drawn downwardly, the plate 16 wedges within the recess 14 and locks the cable end therein.

I have found that a very effective sling structure can be provided by employing a pair of sockets or pockets 14 spaced apart centrally by the web 15 and while at the same time providing as an integral part of the fitting an eye-bar or loop 17. By disposing the pockets 14 on opposite sides of the median line or of the central web 15, I find that a strong balance is provided in which each of the ends of the cable are firmly anchored within the pockets, whereby tension exerted upon the eye member 17 is effective in maintaining the cable ends firmly locked in position.

From the pockets 14, the depending loop portion of the cable 11 extends therefrom and may be readily attached to an equalizer eye 12, as shown in Fig. 1, or to a similar fitting 18 equipped with a hook 19, as illustrated in Fig. 9. The member 19 is provided at its upper side with spaced flanges 20 which provide enough space therebetween to receive one length of a cable 11 and the lower end of the cable extends around the grooved endpiece 21, the groove being indicated by the numeral 22. A similar structure is shown in Fig. 7, except that immediately below the grooved eye portion 23 there extends a hook 19 which may be used for engaging an anchoring element, or may be used to engage a load or a container therefor, etc.

Operation

In the operation of the structure, the ends of the cable may be passed through the pockets 14 of the block portion 13 and looped about wedge plates 16. Tension upon the cable is effective in locking the ends thereof firmly within the pockets, as illustrated in Fig. 3. The resulting structure provides an eye-equipped block having a cable loop, with the ends of the cable which form the loop held securely within the central portion of the block member 10. The lower looped end of the cable may be employed as a means for anchoring the block 10, or the same may be equipped with a hook or other desired connecting member. With this structure, there is provided a single eye, double socket, providing a double line sling and thus furnishing means for hanging a haulback tail or lead block on the single-eyed strap for the many purposes and advantages that are obvious to those acquainted with rigging. At the same time, an excellent balance of strength factors of the elements is provided and the structure permits the use of a single cable length to be readily utilized in the provision of the sling and with the spaced cable ends balanced with respect to the single eye.

In the illustration given in Figs. 10–15, inclusive, the block structure 13a has been changed in contour and the socket recesses 14a are merged in the lower portion of the block. The wedge plates 16a are each provided with a circular groove 25, as shown best in Figs. 11 and 12. The loop or eye-bar 17a merges with a substantially square block portion 13a, and the web 15a extends to the bottom of the block.

In the modification shown in Fig. 15, the web 15a is omitted and partial dividers 26 and 27 extend inwardly toward each other to provide abutments for retaining the wedge plates 16a on either side of the members 26 and 27 of the block 13b.

In the modified structure shown in Figs. 10–15, inclusive, the sharp corners have been eliminated and the structure modified to provide substantial space for the operation of the wedge plates, the wedge plates, as described above, being provided with circular grooves for receiving ropes of different sizes, etc.

The double wedge structure, in combination with the sling elements heretofore described, is of considerable importance for the advantages which have been set out above. Further, such slings have been found to have industrial application of considerable importance in the suspension of vibrating screens. One difficulty in the supporting of vibrating screens by ropes is that such ropes tend to "fix" as resonance with the motor, and for this reason the lengths must be limited, and in the case of a single line, a damping mass must be added or the line shortened. By employing the double line as provided by the double socket structure, the damping mass may be interposed between the two suspending lines and the resultant angularity in the lines effects quite a different period of vibration. This result is of particular importance when screens are installed in places where vertical height is restricted and the vibrating characteristics of the suspension must be controlled.

It has also been found that the efficiency of the double socket is of the order of 1.4 times the strength of a single line, and this is an important consideration on construction work where the tendency is to use as light a line as possible.

It has been found that the structure shown in Figs. 1 to 9, inclusive, is particularly suitable for use with ropes or cables having a diameter of 3/8 of an inch or less, while the modification shown in Figs. 10 to 15, inclusive, is particularly useful with ropes or cables having a diameter above 3/8 of an inch.

While, in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. A sling device, comprising a cable and a socket block receiving the end portions of the cable, said socket block having an integral eye-strap at the upper side thereof and having therebelow and on either side thereof wedge pockets tapering downwardly and inwardly, said wedge pockets being spaced apart with their broad faces in side-by-side relation, wedge plates in said pockets, the end portions of said cable being looped about said wedge plates within said pockets and the depending portions of said cable forming the sling, each leaving a different wedge plate and in a different plane.

2. A sling device, comprising a cable and a socket block receiving the end portions of the cable, said socket block having wedge pockets tapering downwardly and inwardly, said wedge pockets being spaced apart with their broad faces in side-by-side relation, an eye-strap integral with the upper portion of said socket block and extending in parallel with said wedge pockets and between said wedge pockets, wedge plates in said pockets, the end portions of said cable being looped about said wedge plates within said pockets and the depending portions of said cable forming the sling, each leaving a different wedge plate and in a different plane.

References Cited in the file of this patent

UNITED STATES PATENTS

| | | |
|---|---|---|
| 1,850,896 | Roe | Mar. 22, 1932 |
| 1,859,561 | Haworth | May 24, 1932 |
| 2,152,096 | Russell | Mar. 28, 1939 |

FOREIGN PATENTS

| | | |
|---|---|---|
| 108,982 | Great Britain | Aug. 30, 1917 |